United States Patent [19]
Wright

[11] 3,843,148
[45] Oct. 22, 1974

[54] OVERLOAD AXLE ASSEMBLY
[75] Inventor: Jerry L. Wright, Mesa, Ariz.
[73] Assignee: Scranton Manufacturing Company, Inc., Scranton, Iowa
[22] Filed: Feb. 26, 1973
[21] Appl. No.: 335,941

[52] U.S. Cl. .......... 280/124 R, 280/43 R, 280/87 R
[51] Int. Cl. ............................................. B60g 11/02
[58] Field of Search ............... 280/124, 43 R, 81 R; 267/52, 54

[56] References Cited
UNITED STATES PATENTS
| | | | |
|---|---|---|---|
| 2,698,186 | 12/1954 | Pehl | 280/43 R |
| 2,706,880 | 4/1955 | Steuerwald | 280/43 R |
| 3,195,917 | 7/1965 | Baldock | 280/81 R |
| 3,380,607 | 4/1968 | Dale | 280/81 R |

*Primary Examiner*—Philip Goodman
*Attorney, Agent, or Firm*—Henderson & Strom

[57] ABSTRACT

An overload axle assembly for pickup trucks including a pair of spring hanger brackets adapted for attachment to frame members of a pickup truck, leaf springs supported by the hanger brackets, and an axle attached to the springs, the axle having wheel-supporting spindles at each end. The assembly provides for attachment to different types and sizes of pickup trucks, and provides for adjustable positioning of the elevation of the axle to suit varying truck designs and load requirements.

8 Claims, 10 Drawing Figures

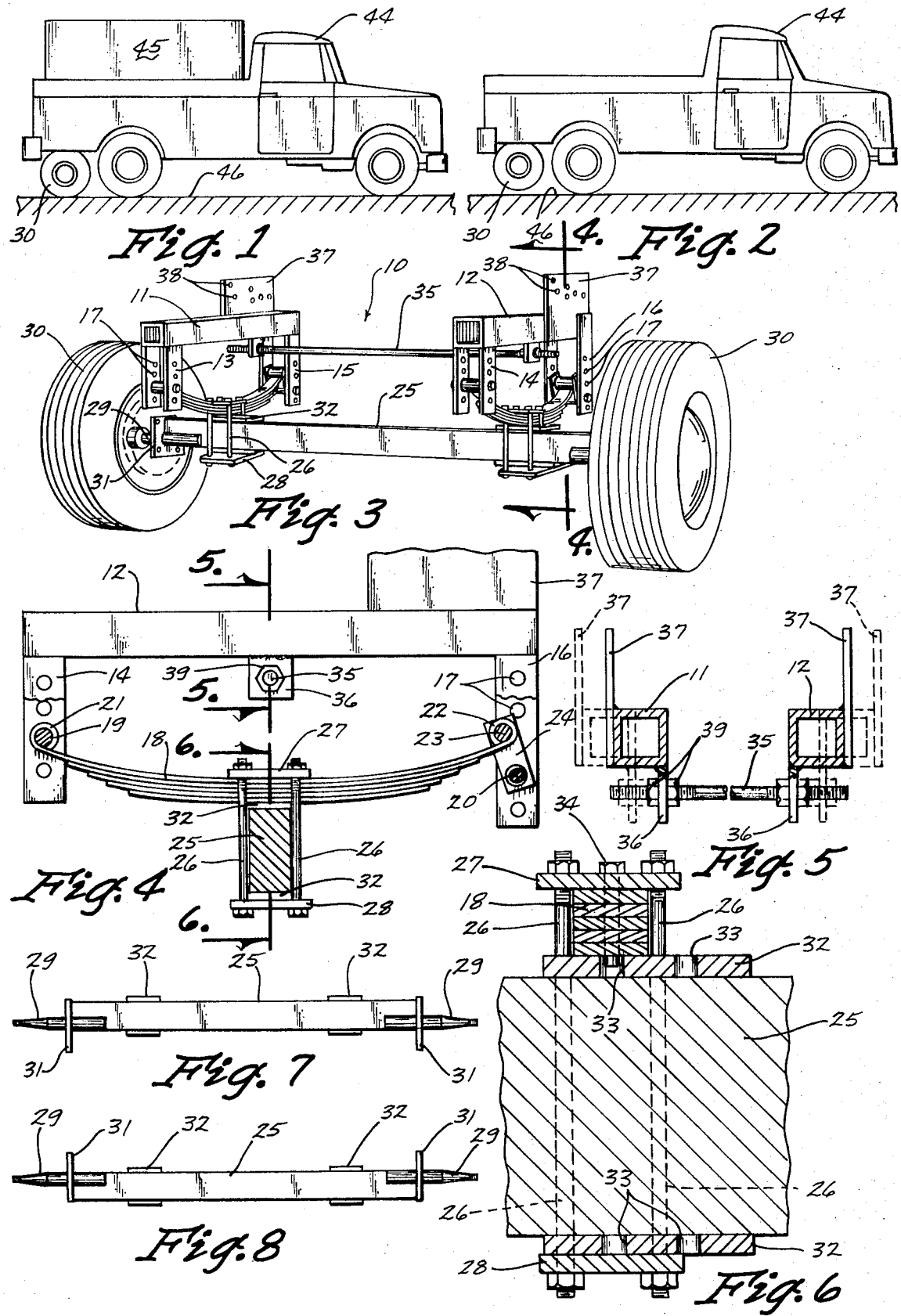

OVERLOAD AXLE ASSEMBLY

BACKGROUND OF THE INVENTION

This invention relates to overload axles for pickup trucks, and more particularly to an overload axle assembly which is adapted to fit most sizes and models of pickup trucks, and which can be adjusted to assume a desired portion of a load applied to the pickup truck.

It is not uncommon for operators of pickup trucks to load the truck beds beyond the design capability of the truck. This has been a problem for many years in connection with farm operations, and in recent years has particularly become a problem due to the increased use of pickup trucks for carrying large camper bodies and the like. A number of devices, variously referred to as tandem axles, tag axles, and overload axles, have recently become available to alleviate the problem of hazardous overloading of pickup trucks. One such device is described in U.S. Pat. No. 3,436,096. Presently available overload axles are helpful to some extent in providing stabilizing action to an overloaded pickup truck. However, the overload axles available prior to this invention all had one or more serious shortcomings. In some cases, the overload axles have no provision for adjustment, such that they are not effective over a wide range of conditions. Another drawback of previously available overload axles is that in most cases they extended beyond the normal length of the pickup trucks, and thus were vulnerable to damage and reduced the maneuverability of the pickup trucks. An early version of a truck extension having this drawback is described in U.S. Pat. No. 1,366,771.

A properly designed overload axle provides many advantages to the truck operation. It gives better weight distribution, reduces blowout danger, reduces sway on rough roads even with shifting loads, improves towing capability and stability, and provides a safer ride when carrying large bulky loads in high cross winds. Ideally, an overload axle should be designed such that it does not come into contact with the road until a load is applied to the truck. That is, the axle should be adjustable to the extent that it will ride free of the road under unloaded conditions, and will contact the road to assume a desired portion of the load under any given load condition.

It is apparent that a need exists for an overload axle which can be adapted to fit most or all models of pickup trucks, including the smaller imported and domestic models, which can be adjusted to suit varying load conditions, and which does not extend the length of the truck to which it is attached.

SUMMARY OF THE INVENTION

In accordance with this invention, a pair of spring hanger brackets are provided which are attachable one to each side of a pickup truck through a frame member of the truck. The spring hanger bracket includes provision for vertical adjustment of a spring supported by the bracket. An axle is connected to the springs and includes a wheel supporting spindle at each end. In addition to the vertical adjustment provided by the spring hanger bracket, additional adjustment is provided by the particular shape of the axle member and the positioning of the wheel-supporting spindles thereon.

It is an object of this invention to provide an overload axle for pickup trucks which is adapted to universally fit different models and sizes of pickup trucks. It is a further object of the invention to provide an overload axle which can be positioned in a choice of elevations to provide stability to a pickup truck under varying load conditions.

That the above and additional objects and advantages are obtained by the present invention will become apparent upon consideration of the detailed description of a preferred embodiment thereof.

BRIEF DESCRIPTION OF THE DRAWINGS

FIG. 1 is a side elevation showing a pickup truck having an overload axle in accordance with the invention, the pickup truck being in a loaded configuration.

FIG. 2 is a side elevational view of a pickup truck having an overlaod axle in accordance with the invention, the pickup truck being in an unloaded condition.

FIG. 3 is a perspective view of an overload axle assembly in accordance with a preferred embodiment of the invention.

FIG. 4 is a cross-sectional view, partially broken away, taken along the line 4—4 of FIG. 3.

FIG. 5 is a cross-sectional view taken along the line 5—5 of FIG. 4, illustrating by dotted lines the adjustable width of the device.

FIG. 6 is an enlarged cross-sectional view taken along the line 6—6 of FIG. 4.

FIG. 7 is a front elevational view showing the axle of the assembly in the normal position with the spindles attached near the lower edge thereof.

FIG. 8 is a front elevational view of the axle shown in FIG. 7, with the axle rotated 180° about its longitudinal axis.

DESCRIPTION OF THE PREFERRED EMBODIMENT

Figure 10:
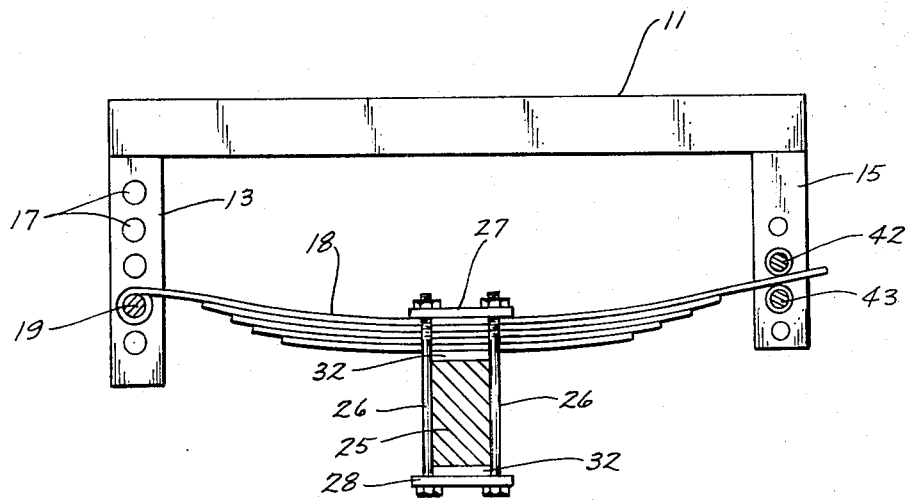
FIG. 10 is a side elevational view showing a variation of the spring assembly.

A preferred embodiment of an overload axle assembly in accordance with the invention is described below in conjunction with the several views of the drawings. It is to be understood that this description is exemplary, and is not intended to represent the only embodiment of the invention, but rather is to represent the most preferred one.

FIG. 3 best illustrates the overall overload axle assembly in accordance with the invention. As shown therein, an overload axle assembly is illustrated generally at 10 and includes a pair of spring hanger brackets 11 and 12. The spring hanger brackets include downwardly depending arms 13 and 14 at one end thereof and similar arms 15 and 16 at the other end thereof. Each of the arms 13 through 16 on both spring hanger brackets includes a series of vertically spaced holes 17. Since the two spring hanger brackets 11 and 12 are essentially identical, except for being mirror images of one another, and since the springs which each supports are identical, only one sub-assembly will be described in detail, and it will be apparent that the description could apply to either of these. A spring 18 extends between arms 13 and 15, and is supported thereby by pins 19 and 20 extending through selected holes 17 and each of the arms 13 and 15 depending from the spring hanger bracket 11.

The spring 18, as best seen in FIG. 4, is a conventional multi-leaf semi-elliptical arrangement wherein one end 21 is supported directly by pin 19, and the other end 22 is supported by a pivot pin 23 affixed to an arm 24 which in turn is attached to the spring hanger bracket by pin 20. The above described manner of connecting this type of spring to a spring hanger bracket is well known, and allows for movement of the end 22 of the spring 18 in response to flexing of the spring 18. The two subassemblies, each comprising a spring hanger bracket and a spring, are attached to an axle 25 by bolts 26 extending through upper plates 27 and lower plates 28. The arrangement of the bolts and plates is clearly illustrated in FIGS. 3, 4 and 6. The axle 25 has a rectangular cross-section through its longitudinal axis as best seen in FIG. 4, and has a spindle 29 attached to and extending therefrom at each end thereof. As seen in FIG. 7, which is a view of the axle in its normal operating position, the spindles 29 are attached near the lower part of the axle 25. By placing the spindles in this off-center position on axle 25, the elevation of wheels 30 supported thereby can be varied by rotating the axle 25 180° about its longitudinal axis to place the spindles 29 in the position shown in FIG. 8. This adjustable feature is in addition to the vertical adjustment provided by the series of holes 17, and normally would only be used when the assembly 10 is utilized on a pickup truck having a very low frame.

The wheels 30 are attached to the spindle 29 in a conventional manner, and may or may not include braking means. A plate 31 is shown in FIG. 3 at the end of axle 25 for attachment of a brake drum, if desired.

Referring now to FIGS. 6 and 7, mounting pads 32 are attached to the top and bottom of axle 25 slightly in from each end of the axle. These mounting pads each include openings 33 (FIG. 6) formed therein. As seen in FIG. 6, a bolt or pin 34 extends through the leaves of the spring 18 and into one of the openings 33 in the mounting pad 32 as shown in FIG. 6. To accommodate different widths of truck beds and frames, the bracket and spring subassembly can be moved inwardly or outwardly into another of the holes 33 in the mounting pads 32. In order to precisely space the spring hanger brackets 11 and 12 one from another, and to provide structural support to the overall assembly, a tie rod 35 (FIG. 3) is provided with threaded end portions for adjusting and locking nuts 39 on each side of a projection 36 on each of the spring hanger brackets.

Mounting plates 37 are attached to each of the spring hanger brackets and are provided with a pattern of bolt holes 38 of which a part will match openings in pickup truck frame members of different models. If the pickup truck frame members do not have bolt holes, the frame member can be drilled out to conform to selected ones of the bolt holes 38.

The operation of the tie rod 35 is best illustrated in FIG. 5, wherein it is illustrated how the spring hanger brackets 11 and 12 can be adjustably spaced one from another by changing position of the attachment utilizing nuts 39 on the tie rod 35.

Figure 9:
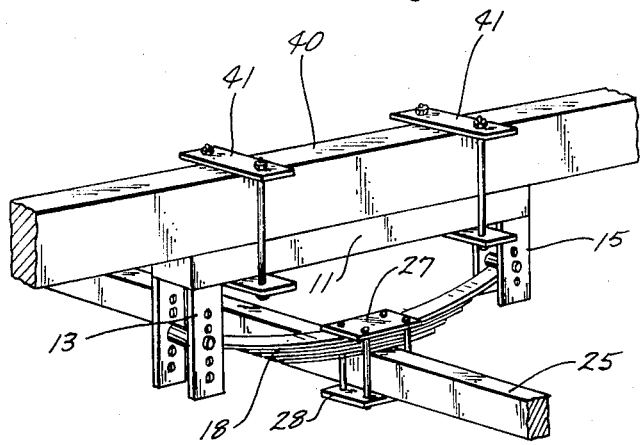
FIG. 9 is a perspective view showing an optional clamp assembly for attaching a spring hanger bracket to a truck frame member.

In addition to the mounting plates 37, the spring hanger brackets 11 and 12 are preferably also attached to the truck frame members by an additional clamp, or if desired the mounting plates 37 can be eliminated and the spring hanger brackets can be attached to a truck frame member 40 by a pair of clamps 41 as illustrated in FIG. 9. Alternatively, the spring hanger brackets could be welded to the truck frame, but this is generally undesirable in that by using a removable connection the axle assembly 10 can be removed and reused when the truck is sold or traded.

FIG. 10 illustrates an alternative form of supporting a spring with a spring hanger bracket. As shown therein, one end of the spring is connected as in FIG. 4, and the other end extends through a pair of pins 42 and 43. This alternative type of spring and support is sometimes preferred.

The elevation of the axle 25 with respect to a truck frame can be additionally varied by locating the axle above the springs 18 instead of below the springs as illustrated in FIGS. 3, 4 and 6.

FIG. 2 illustrates the normal position of the wheel 30 when attached to a pickup truck 44 while the truck is in an unloaded condition. When a load 45 is carried by the truck 44, the wheel 30 contacts the road surface 46 as shown in FIG. 1. The wheels 30 can be set to support any desired portion of the load 45, within the capabilities of the overload axle assembly 10, by selecting the proper setting of the springs within the spring hanger brackets, and by rotating the axle 25 to place the spindles 29 at the higher or lower edge of the axle as desired. The amount of the load which is carried by the overload axle can be determined by utilization of a conventional truck scale. FIGS. 1 and 2 illustrate two of the outstanding features of an overload axle in accordance with the invention. The axle assembly does not extend beyond the normal rear dimension of the truck 44, thus allowing the truck itself to protect the axle assembly, as contrasted to most tandem or overload axles which extend beyond the rear of the truck bed. Also, FIG. 2 shows that the wheels 30 are out of contact with the road 46 when the truck 44 is unloaded. This saves wear on the tires and the entire assembly when operating the truck in an unloaded condition, in which case the overload axle is not generally needed any way.

The assembly and installation of an overload assembly in accordance with the invention will now be described briefly. The spring hanger brackets 11 and 12 are first attached by aligning the bolts holes 38 in mounting plates 37 with holes in the pickup frame, or by clamping or otherwise securing the spring hanger brackets to the frame. The axle 25 is then clamped to the springs 18 utilizing the proper holes 33 in mounting pads 32 to suit the particular type of truck. The springs are then positioned in the spring hanger brackets by the pins through holes selected to allow the assembly to carry the desired amount of weight under the anticipated loading conditions. The tie rod 35 is inserted and adjusted to provide additional rigidity to the assembly. The above steps are performed in reverse order to remove the axle assembly from the truck. When different load conditions are anticipated, the axle can be raised or lowered relative to the truck frame by repositioning the springs 18 in the spring hanger brackets 11 and 12.

The above detailed description of the preferred embodiment of the invention is for purposes of illustration, and is not to be considered as limiting the scope of the invention. Numerous modifications and variations will be apparent to those skilled in the art, and in many instances equivalent elements could be substituted for those described, and in certain instances some of the described elements could be eliminated from the assembly without departing from the invention, which is to be defined by the appended claims.

I claim:

1. An overload axle assembly comprising:
a pair of spring hanger brackets, each having a forward and a rearward downwardly depending means including a plurality of vertically spaced spring-positioning holes therein;
a spring means carried by each of the spring hanger brackets;
an axle having a wheel-supporting spindle at each end thereof; and
means attaching each of said spring means to said axle and having four plates and a plurality of bolts, one of said plates being placed against the upper surface of each of said spring means intermediate the ends of said spring means, and one of said plates being placed against the bottom surface of said axle inwardly from said spindles and directly below each of said spring means, said bolts connecting said plates against said spring means with said plates against said axle.

2. An overload axle assembly as defined in claim 1 wherein each of the pair of spring hanger brackets has a mounting plate attached thereto, the mounting plate including bolt holes and being adapted to be bolted to a frame member of a pickup truck, said bolt holes being arranged in a pattern where each of said bolt holes differs from the rest of said bolt holes either in horizontal displacement from the side edge of said mounting plate or in vertical displacement from the bottom edge of said mounting plate or in both said horizontal and vertical displacements, whereby said mounting plate provides both for vertical and horizontal adjustment of said spring hanger bracket.

3. An overload axle assembly comprising:
a pair of spring hanger brackets, each having a forward and a rearward downwardly depending means including a plurality of vertically spaced spring-positioned holes therein;
a spring means carried by each of the spring hanger brackets;
an axle having a wheel-supporting spindle at each end thereof and having mounting pads thereon, mounting pads being adapted to position the springs on the axle at one of a plurality of mounting positions; and means attaching each of said spring means to said axle.

4. An overload axle assembly comprising: a pair of spring hanger brackets, each having a forward and a rearward downwardly depending means including a plurality of vertically spaced spring-positioned holes therein, and each of the spring hanger brackets having a tie bolt eye, and an adjustable tie bolt extends through each of the tie bolt eyes;
a spring means carried by each of the spring hanger brackets;
an axle having a wheel-supporting spindle at each end thereof; and means attaching each of said spring means to said axle.

5. An overload axle assembly as defined in claim 1 wherein the spindles at each end of the axle are on a common axis, said common axis being different from the central longitudinal axis of the axle.

6. An overload axle assembly comprising:
a pair of spring hanger brackets, each having a forward and a rearward downwardly depending means including a plurality of vertically spaced spring-positioning holes therein;
a spring means carried by each of the spring hanger brackets;
an axle having a wheel-supporting spindle at each end thereof, said spindles at each end of the axle beng on a common axis, said common axis being different from the control longitudinal axis of the axle, the axle being rectangular in cross-section through its longitudinal axis, thus having a top and a bottom,
the spindles being attached to the axle near the bottom thereof, and said axle having mounting pads provided at both the top and the bottom of the axle, whereby the elevation of the spindles can be varied by either rotating the axle 180° about its longitudinal axis, or by selectively placing the axle above or below the spring means and
means attaching each of said spring means to said axle.

7. An overload axle assembly as defined in claim 6 wherein each of the mounting pads has a plurality of positioning means formed therein and each of the spring means comprises a plurality of superposed semi-elliptic spring leaves and includes a projecting pin extending from the midpoint thereof and adapted to position the springs relative to the axle by projecting into a selected one of the positioning means formed in the mounting pads.

8. An overload axle as defined in claim 7 wherein one end of each of said spring means is adapted to receive a supporting pin therethrough, and the other end of each of said spring means is adapted to be slidably supported between a pair of positioning pins.

* * * * *